(12) United States Patent
Manna et al.

(10) Patent No.: US 12,139,171 B2
(45) Date of Patent: Nov. 12, 2024

(54) METHOD AND SYSTEM FOR CONTROLLING A MOTOR VEHICLE

(71) Applicant: TRW AUTOMOTIVE GMBH, Alfdorf (DE)

(72) Inventors: Carlo Manna, Genk (BE); Christian Wissing, Dortmund (DE); Manuel Schmidt, Dortmund (DE); Andreas Homann, Dortmand (DE); Christian Lienke, Dortmund (DE); Torsten Bertram, Düsseldorf (DE)

(73) Assignee: ZF AUTOMOTIVE GERMANY GMBH, Alfdorf (DE)

(*) Notice: Subject to any disclaimer, the term of this patent is extended or adjusted under 35 U.S.C. 154(b) by 679 days.

(21) Appl. No.: 17/298,977

(22) PCT Filed: Dec. 16, 2019

(86) PCT No.: PCT/EP2019/085299
§ 371 (c)(1),
(2) Date: Jan. 20, 2022

(87) PCT Pub. No.: WO2020/127010
PCT Pub. Date: Jun. 25, 2020

(65) Prior Publication Data
US 2022/0153308 A1    May 19, 2022

(30) Foreign Application Priority Data
Dec. 17, 2018  (DE) .......................... 102018132523.1

(51) Int. Cl.
*B60W 60/00* (2020.01)
*B60W 30/12* (2020.01)
*B60W 30/18* (2012.01)

(52) U.S. Cl.
CPC ........ *B60W 60/0027* (2020.02); *B60W 30/12* (2013.01); *B60W 30/18163* (2013.01);
(Continued)

(58) Field of Classification Search
CPC ............. B60W 60/0027; B60W 30/12; B60W 30/18163; B60W 2520/10;
(Continued)

(56) References Cited

U.S. PATENT DOCUMENTS

2015/0142207 A1    5/2015  Flehmig et al.
2018/0370527 A1*  12/2018  Rachor ................. B60W 30/16

FOREIGN PATENT DOCUMENTS

DE    102011080928 A1    2/2013
DE    102015016899 A1    6/2016

OTHER PUBLICATIONS

Schlechtriemen et al "Wiggling through Complex Traffic Planning Trajectories Constrained by Predictions", pp. 1293-1300—2016 IEEE Intelligent Vehicles Symposium, Gothenburg Sweden—Jun. 19-22, 2016.
(Continued)

*Primary Examiner* — Rodney A Butler
(74) *Attorney, Agent, or Firm* — ROSSI, KIMMS & McDOWELL LLP

(57) ABSTRACT

Methods and systems for controlling driving maneuvers of a motor vehicle driving in a current driving lane on a road are described. Spatio-temporal regions defining free regions and/or occupied regions in the current driving lane and a further driving lane, adjacent to the current driving lane of the motor vehicle, are determined. Changing regions, in which a driving lane change between the current and the further driving lanes is possible, and/or lane-keeping regions, in which a driving lane change between the current and the further driving lanes is not possible, are determined
(Continued)

based on the free and/or occupied regions. Possible driving maneuvers of the motor vehicle at least between changing regions and/or lane-keeping regions that adjoin one another in pairs are determined and executed.

20 Claims, 6 Drawing Sheets

(52) U.S. Cl.
CPC ... *B60W 2520/10* (2013.01); *B60W 2520/105* (2013.01); *B60W 2552/10* (2020.02); *B60W 2554/4041* (2020.02); *B60W 2554/802* (2020.02)

(58) Field of Classification Search
CPC ....... B60W 2520/105; B60W 2552/10; B60W 2554/4041; B60W 2554/802
See application file for complete search history.

(56) References Cited

OTHER PUBLICATIONS

Bender et al. "The Combinatorial Aspect of Motion Planning: Maneuver Variants in Structured Environments", pp. 1386-1392—2015 IEEE Intelligent Vehicles Symposium—Jun. 28-Jul. 1, 2015, COEX, Seoul Korea.
Werling et al "Optimal Trajectory Generation for Dynamic Street Scenarios in a Frenet Frame", 2010 IEEE International Conference on Robotics & Automation Anchorage Convention District—pp. 987-993—May 3-8, 2010, Anchorage Alaska, USA.
Bala R. Vatti "A Generic Solution to Polygon Clipping"—Communications of the ACM—Jul. 1992/vol. 35 No. 7—pp. 56-63.

\* cited by examiner

METHOD AND SYSTEM FOR CONTROLLING A MOTOR VEHICLE

The invention relates to a method for controlling a motor vehicle, to a control unit for a system for controlling a motor vehicle, to a system for controlling a motor vehicle, to a computer program for carrying out the method, and to a computer-readable data carrier having such a computer program.

One of the main challenges for driver assistance systems that control a longitudinal movement and a transverse movement of a motor vehicle in a partially automated manner, and especially for motor vehicles that drive in a fully automated manner, is that of analyzing a specific situation in which the motor vehicle finds itself and, based thereon, deriving corresponding meaningful driving maneuvers for the motor vehicle.

The complexity of the calculation of the driving maneuvers generally increases with the time period of the individual driving maneuvers. If various possible driving maneuvers for a relatively long time period, for example longer than three seconds, are intended to be determined or if the driving maneuvers are complex ones involving a plurality of lane changes, methods that are known in the art are no longer able to ascertain them in real time.

It is therefore the object of the invention to provide a method and a system for controlling a motor vehicle in which the disadvantages from the prior art are improved.

The object is achieved according to the invention by a method for controlling a motor vehicle driving on a road in a current driving lane, wherein the road has at least one further driving lane adjacent to the current driving lane of the motor vehicle. Initially, free regions and/or occupied regions, which are occupied by other road users, are ascertained at least in the current driving lane of the motor vehicle and in the at least one further driving lane, wherein the free regions and the occupied regions are spatio-temporal regions. Changing regions, in which a driving lane change between the two driving lanes is possible, and/or lane-keeping regions, in which a driving lane change between the two driving lanes is not possible, are ascertained based on the ascertained free regions and/or occupied regions, wherein the changing regions and the lane-keeping regions are each a spatio-temporal partial region of the free regions. Possible driving maneuvers of the motor vehicle at least between changing regions and/or lane-keeping regions that adjoin one another in pairs will now be ascertained.

The method according to the invention is based on the core idea of mapping the road to a space-time diagram and dividing the road in this space-time diagram into different partial regions, specifically into partial regions in which a driving lane change is possible and into partial regions in which no driving lane change is possible. It is then possible to ascertain possible driving maneuvers between these individual partial regions very quickly and in a resource-saving manner, since only ever a small partial region of the road needs to be considered rather than the entire road traffic situation. Using the method according to the invention, it is therefore possible to ascertain different possible driving maneuvers in real time.

In particular, the method according to the invention is a computer-implemented method, which is carried out on a control unit of the motor vehicle and/or on a control unit of a superordinate guidance system, which is assigned, for example, at least to the section of the road in which the motor vehicle is currently driving, wherein the motor vehicle and the guidance system are connected to one another for signal transmission and can exchange signals with one another.

The spatio-temporal regions and the spatio-temporal partial regions are here described in each case by at least one spatial coordinate, in particular a longitudinal coordinate in the direction of the road, and by a time coordinate. In particular, a coordinate in the transverse direction with respect to the road is discretized and defined at a specific value per driving lane.

A driving maneuver here and below is understood to mean at least one transition of the motor vehicle from one spatio-temporal partial region into another. These transitions can here of course only take place in the positive time direction. Generally, a driving maneuver consists of a plurality of transitions in a row between individual, adjoining spatio-temporal partial regions.

In particular, the occupied regions comprise not only partial regions that are actually occupied by another road user but also additionally a safety distance from the relevant other road user, which needs to be observed, wherein the safety distance can be specified, pre-set, and/or selectable by the driver. In addition, the occupied regions can also comprise partial regions that are impassable due to other obstacles, such as construction sites or the like.

According to one aspect of the invention, the changing regions are those partial regions of the free regions of the current driving lane and of the at least one further driving lane in which both the current driving lane and also the at least one further driving lane are free from other road users. In particular, the free regions are also free of other obstacles, such as construction sites or the like, that would make them impassable. The changing regions are thus the regions of the current driving lane and of the at least one further driving lane in which it is possible to change lanes because both the current driving lane and the at least one further driving lane are free.

According to one configuration of the invention, the lane-keeping regions are those partial regions of the free regions of the current driving lane and of the at least one further driving lane in which the respectively other one of the driving lanes is occupied and/or a driving lane change is otherwise not possible. In other words, the lane-keeping regions are thus those partial regions in which a driving lane change is not possible because another road user is located on the adjacent driving lane, because the adjacent driving lane is otherwise blocked, and/or because overtaking or changing lanes is prohibited on the corresponding road section.

For ascertaining the changing regions, a determination is made according to a further aspect of the invention as to whether a lane-changing zone located spatially between the current driving lane and the at least one further driving lane is free, is occupied by other road users, or is otherwise impassable. A transition from one driving lane to the other thus takes place via said lane-changing zone. The lane-changing zone is here free precisely when both the current driving lane and the further driving lane are free. Consequently, the lane-changing zone is occupied precisely when at least one of the two driving lanes is occupied. With the lane-changing zone, account is taken of the fact that the motor vehicle and other road users briefly block both driving lanes during a lane change. The lane-changing zone is for example otherwise impassable when overtaking or changing lanes is prohibited on the corresponding road section and/or when obstacles prevent driving in the lane-changing zone.

In each case at least one space-time polygon corresponding to the current driving lane, at least one space-time polygon corresponding to the at least one further driving lane, and at least one space-time polygon corresponding to the occupied regions are preferably determined, wherein space-time polygons corresponding to the free regions of the two lanes are determined from the determined polygons by means of polygon clipping, in particular wherein those polygons that correspond to the occupied regions are in each case removed from the polygons that correspond to one of the two driving lanes in order to ascertain the free regions. In other words, ascertainment of the free regions is reduced to a geometric operation that can be performed very quickly and in a resource-saving manner, which thus saves calculation time in the ascertainment of the possible driving maneuvers.

In particular, the respective driving lane and the occupied regions of the individual lanes are in each case polygons in an (L,t) coordinate system, wherein L denotes the current longitudinal direction of the road, and t denotes time. The free regions for the driving lane number i are thus obtained, expressed symbolically, with the operation $P_{Spur,i} \backslash P_{belegt,i}$, wherein $P_{Spur,i}$ is the space-time polygon that corresponds to the driving lane i, and wherein $P_{belegt,i}$ comprises all space-time polygons that enclose occupied regions in the driving lane number i.

With further preference, an intersection of the two polygons that correspond to the free regions in the two driving lanes is formed in order to determine the changing regions and lane-keeping regions, in particular in order to determine whether the lane-changing zone is free. In other words, the free regions of the lane-changing zone are thus obtained as an intersection of the polygons that correspond to the free regions in the individual driving lanes, that is to say by the operation $P_{frei,i} \cap P_{frei,j}$. Ascertainment of the changing regions and the lane-keeping regions is thus reduced to a geometric operation that can be performed very quickly and in a resource-saving manner, which thus saves computation time in the ascertainment of the possible driving maneuvers.

According to one configuration of the invention, at least the current driving lane and/or the at least one further driving lane are/is transformed to a Frenet-Serret coordinate system. In this coordinate system, every road is curvature-free, with the result that every road traffic situation can be treated in the same way, independently of any actual profile of the road. In particular, the above-described space-time polygons are ascertained in the Frenet-Serret coordinate system.

According to a further aspect of the invention, in each case one lane vertex is assigned to the changing regions and/or the lane-keeping regions of the two lanes, wherein the lane vertices are connected in pairs by edges if a driving maneuver of the motor vehicle between the corresponding changing regions and/or the lane-keeping regions is possible, in particular wherein the lane vertices are arranged by time. A sequence of driving maneuvers that are performable successively is therefore obtained from an uninterrupted train of edges along the lane vertices in the rising time direction. In this way, a graph is produced which contains a plurality of different possible driving maneuvers, in particular all possible driving maneuvers. The graph generated can then be processed further by further modules and/or subsystems of the motor vehicle, for example by a module that determines, from the possible driving maneuvers, that driving maneuver that is to be performed.

The lane-changing zone is preferably assigned at least one changing zone vertex, in particular wherein the lane-changing zone is divided into a plurality of time strips that are each assigned at least one changing zone vertex, wherein the at least one changing zone vertex is connected to the lane vertices in pairs by edges if a driving maneuver of the motor vehicle between the corresponding partial region of the lane-changing zone and the corresponding changing region or lane-keeping region is possible. A sequence of driving maneuvers that are performable successively is therefore obtained from an uninterrupted train of edges along the lane vertices and the changing zone vertices in the rising time direction. In this way, a graph is produced which contains a plurality of different possible driving maneuvers, in particular all possible driving maneuvers. The graph generated can then be processed further by further modules and/or subsystems of the motor vehicle, for example by a module that determines, from the possible driving maneuvers, that driving maneuver that is to be performed.

In particular, a new time strip for the lane-changing zone begins with each event on one of the two driving lanes. An event is here and below understood to mean any type of change in the occupation status of one of the two driving lanes.

A plurality of differing driving maneuvers for the motor vehicle are preferably ascertained, in particular all possible driving maneuvers. In other words, not only a single possible driving maneuver but a plurality of differing driving maneuvers are determined, wherein the different driving maneuvers represent the different possibilities of how the motor vehicle can be controlled. The different driving maneuvers can then be passed on to further modules and/or subsystems of the motor vehicle, for example to a module that selects, from the possible driving maneuvers, that driving maneuver that is to be performed.

According to a further aspect of the invention, forecast trajectories of the other road users are taken into account in the ascertainment of the free regions and/or the regions occupied by the other road users. The forecast trajectories can be predicted by another module or subsystems of the motor vehicle, can be received from the other road users by way of inter-vehicle communication, and/or can be received from a guiding system that is assigned at least to the section of the road on which the motor vehicle is currently driving. In particular, the forecast trajectories also contain lane changes of the further road users. The method according to the invention thus makes it possible to include driving maneuvers of the further road users in the ascertainment of the possible driving maneuvers of the motor vehicle and to control the motor vehicle in a manner which is adapted to the respective specific road traffic situation.

According to one configuration of the invention, it is ascertained whether the motor vehicle can reach the respective spatio-temporal partial regions, in particular wherein a current speed of the motor vehicle, a maximum deceleration of the motor vehicle, a maximum acceleration of the motor vehicle, and/or a speed limitation are taken into account. The partial regions that are not reachable are then no longer taken into account in the following steps for controlling the motor vehicle, which saves computing time in the determination of the possible driving maneuvers.

Preferably, trajectories of the motor vehicle corresponding to the driving maneuvers are ascertained. The trajectories are here in each case an ascertained space-time curve along which the motor vehicle moves if the trajectory is selected, and the motor vehicle is correspondingly controlled. In particular, these are optimized trajectories that are optimized on the basis of one or more conditions. For example, the distance traveled should be as short as possible, a duration of the driving maneuver should be minimized, and/or any longitudinal and/or transverse accelerations that occur should not exceed a predefined limit acceleration.

In particular, at least one sensor captures the current driving lane and/or the at least one further driving lane in order to ascertain the free regions, occupied regions, and/or impassability. The at least one sensor generates corresponding surroundings data that are used to generate an image of the surroundings, in particular in the form of a space-time diagram.

The at least one sensor can be a camera, a radar sensor, a distance sensor, a LIDAR sensor, and/or any other type of sensor that is suitable for capturing at least some of the surroundings of the motor vehicle.

Alternatively or additionally, the at least one sensor can be present in the form of an interface to a guiding system that is assigned at least to the section of the road on which the motor vehicle is currently driving. The guiding system is here embodied to transmit surroundings data regarding the road and/or the further road users, in particular the forecast trajectories thereof, to the motor vehicle and/or to the further road users.

According to a further configuration of the invention, at least one of the possible driving maneuvers is selected, and the driver is provided with details on the basis of the at least one driving maneuver. The details are in particular information relating to the at least one selected driving maneuver. For example, a plurality of possible driving maneuvers are selected and displayed on a user interface. The driver can decide which of the possible driving maneuvers is to be performed and select this driving maneuver for example via the user interface.

One of the possible driving maneuvers is preferably selected, and the vehicle is controlled in accordance with the selected driving maneuver. The motor vehicle is here controlled in an at least partially automated manner, in particular in a fully automated manner, based on the selected driving maneuver. The selected driving maneuver is preferably an optimum driving maneuver selected from the plurality of possible driving maneuvers on the basis of boundary conditions. For example, the distance traveled should be as short as possible, a duration of the driving maneuver should be minimized, and/or any longitudinal and/or transverse accelerations that occur should not exceed a predefined limit acceleration.

The object is additionally achieved according to the invention by a control unit for a system for controlling a motor vehicle, wherein the control unit is configured to perform an above-described method. With respect to the advantages, reference is made to the above explanation with respect to the method.

The control unit can be part of the motor vehicle or part of a superordinate system, for example part of the guiding system.

The object is further achieved according to the invention by a system for controlling a motor vehicle, having an above-described control unit. With respect to the advantages, reference is made to the above explanations with respect to the method.

The object is additionally achieved according to the invention by a computer program having program code means for carrying out the steps of an above-described method if the computer program is executed on a computer or a corresponding computing unit, in particular a computing unit of an above-described control unit. With respect to the advantages, reference is made to the above explanations with respect to the method.

"Program code means" are here and below understood to mean computer-implementable instructions in the form of program code and/or program code modules in a compiled and/or non-compiled form, which may be present in any programming language and/or machine language.

The object is furthermore achieved according to the invention by a computer-readable data carrier, on which an above-described computer program is stored. The data carrier can be an integral part of the above-described control unit or can be separate from the control unit. The data carrier has a memory in which the computer program is stored. The memory is any suitable type of memory, for example based on magnetic and/or optical data storage.

Further advantages and properties of the invention are evident from the following description and the attached drawings, to which reference is made. In said drawings:

FIG. 1 schematically shows a road traffic situation;

Figure 3:
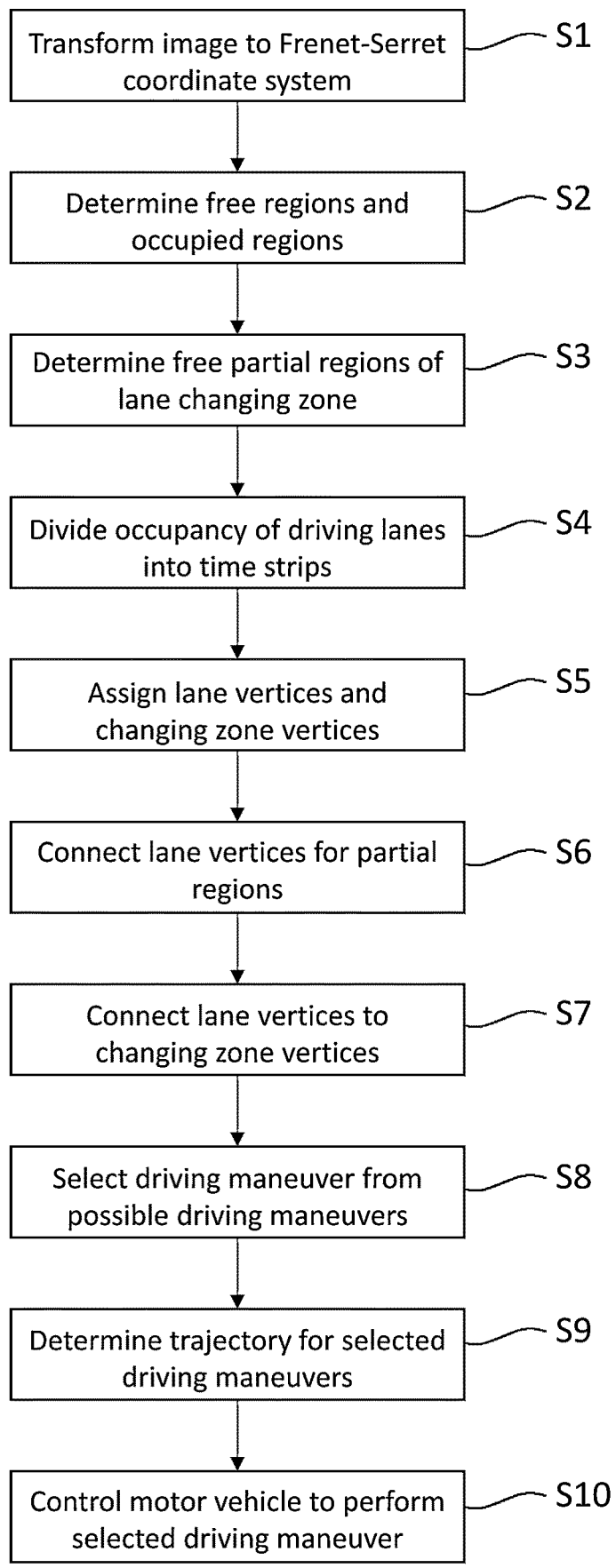
FIG. 3 shows a flowchart of the steps of a method according to the invention.

FIGS. 4(a) and 4(b) schematically show a road before transformation to a Frenet-Serret coordinate system or the road after transformation to a Frenet-Serret coordinate system; and FIGS. 5 to 10 each illustrate individual steps of the method according to the invention of FIG. 3.

Figure 1:
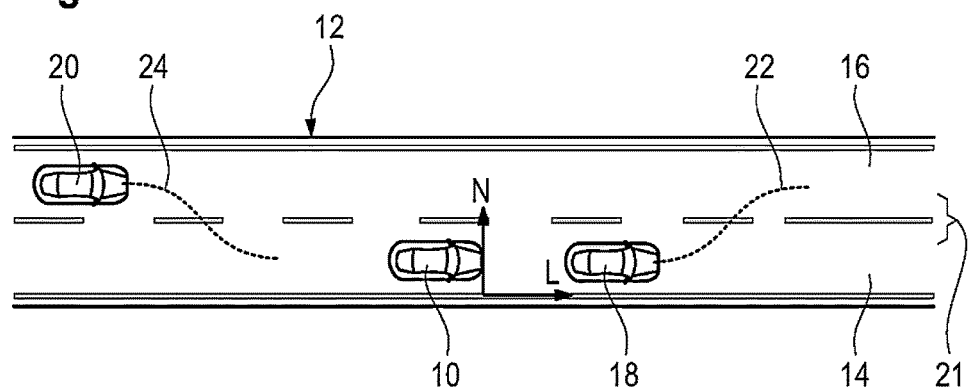

FIG. 1 schematically shows a road traffic situation, in which a motor vehicle 10 is driving on a road 12 in a current driving lane 14. A further driving lane 16 extends next to the current driving lane 14.

On the road 12, a first further road user 18 and a second further road user 20 additionally drive in the current driving lane 14 and in the further driving lane 16, respectively. In the example shown, the further road users 18, 20 are passenger cars, but they could also be trucks, motorcycles, or any other road users.

Located between the current driving lane 14 and the further driving lane 16 is a lane-changing zone 21, which partially overlaps with the current driving lane 14 and the further driving lane 16.

The dashed lines 22 and 24 indicate that the first further road user 18 is planning, in the near future, to change from the current driving lane 14 into the further driving lane 16 via the lane-changing zone 21, and that the second further road user 20 is planning, in the near future, to change from the further driving lane 16 into the current driving lane 14 of the motor vehicle 10 via the lane-changing zone. This is indicated by the further road users 18, 20 for example by using the corresponding indicator light.

In addition, FIG. 1 shows a coordinate system having a longitudinal axis and a normal axis, with the longitudinal axis defining a longitudinal direction L and the normal axis defining a transverse direction N. The origin of the coordinate system lies in the longitudinal direction L at the current position of the front of the motor vehicle 10 and, viewed in the longitudinal direction L, at the right side of the road.

This special coordinate system, which will also be used below, is a road-fixed coordinate system, which consequently does not move with the motor vehicle 10. It is of course also possible to use another arbitrary coordinate system, however.

Figure 2:
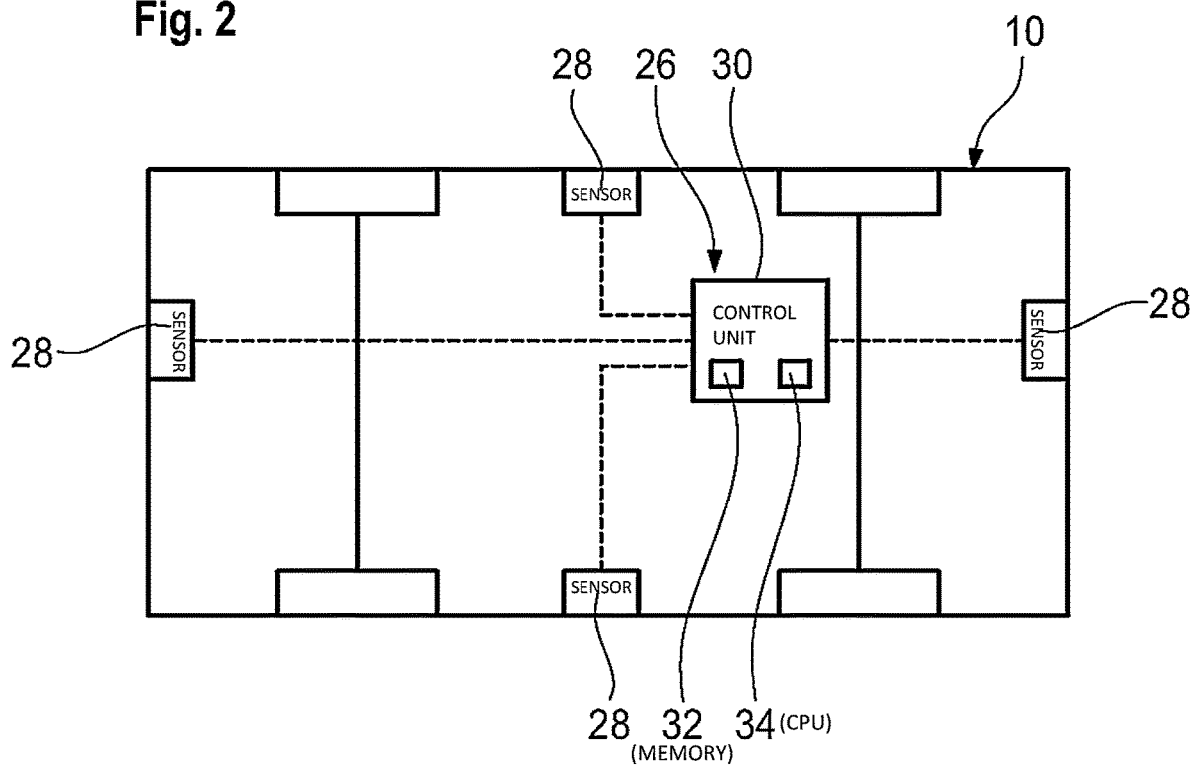
FIG. 2 shows a schematic block diagram of a system according to the invention for controlling a motor vehicle.

As is shown in FIG. 2, the motor vehicle 10 has a system 26 for controlling the motor vehicle 10. The system 26 comprises a plurality of sensors 28 and at least one control unit 30.

The sensors 28 are arranged at the motor vehicle 10 at the front, at the rear, and/or laterally and are configured to capture the surroundings of the motor vehicle 10, to generate corresponding surroundings data, and to pass them on to the control unit 30. More specifically, the sensors 28 capture information at least relating to the current driving lane 14, the further driving lane 16, and the further road users 18, 20.

The sensors 28 are in each case a camera, a radar sensor, a distance sensor, a LIDAR sensor, and/or any other type of sensor that is suitable for capturing the surroundings of the motor vehicle 10.

Alternatively or additionally, at least one of the sensors 28 can be present in the form of an interface to a guiding system that is assigned at least to the section of the road 12 shown and is embodied to transmit surroundings data regarding the road 12 and/or the further road users to the motor vehicle 10 and/or to the further road users 18, 20. The one sensor 28 can in this case be present in the form of a mobile radio communication module, for example for communicating according to the 5G standard.

In general terms, the control unit 30 processes the surroundings data obtained by the sensors 28 and controls the motor vehicle 10 on the basis of the processed surroundings data at least in a partially automated manner, in particular in a fully automated manner. That is to say, a driver assistance system that can control a transverse movement and/or a longitudinal movement of the motor vehicle 10 in an at least partially automated manner, in particular fully automated manner, is implemented on the control unit 30.

For this purpose, the control unit 30 is embodied to carry out the method steps that will be explained below with reference to FIGS. 4 to 10. More specifically, the control unit 30 comprises a data carrier 32 and a computing unit 34, wherein a computer program is stored on the data carrier 32, which computer program is executed on the computing unit 34 and comprises program code means for carrying out the steps of the method explained below.

First, the road 12, more specifically an image of the current driving lane 14 and of the further driving lane 16, which image is based on the surroundings data obtained by the sensors 28, is transformed to a Frenet-Serret coordinate system (step S1).

Figure 4:
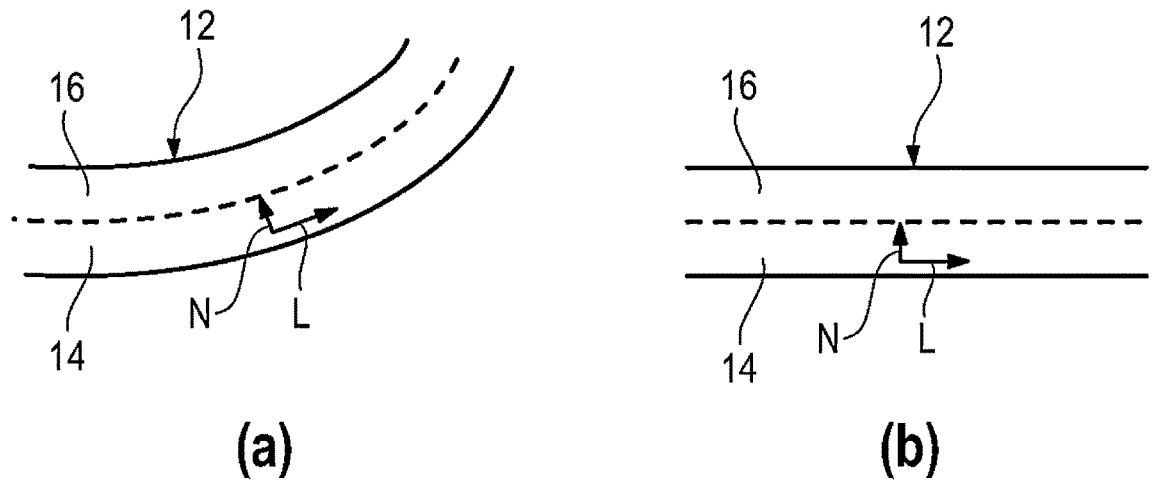

Step S1 is illustrated in FIG. 4. FIG. 4(*a*) shows the road 12 as it actually extends. In the example shown, the road has, viewed in the longitudinal direction L, a curvature toward the left. With a local coordinate transform, the road 12 is transformed to the Frenet-Serret coordinate system in which the road 12 no longer has a curvature, wherein the result of this transform is shown in FIG. 4(*b*). As is clear, the road 12 in this coordinate system extends rectilinearly and without curvature along the longitudinal direction L.

Next, free regions $B_f$ and occupied regions $B_b$ in the current driving lane 14 and in the further driving lane 16 are ascertained (step S2), wherein the free regions $B_f$ and the occupied regions $B_b$ are each spatio-temporal regions.

The free regions $B_f$ are here those spatio-temporal regions that are free from the other road users 18, 20 and other obstacles that make the respective driving lane 14, 16 impassable.

The occupied regions $B_b$, on the other hand, are those spatio-temporal regions that are occupied by the other road users 18, 20 and/or by other obstacles, meaning that the occupied regions $B_b$ are impassable for the motor vehicle 10. In particular, the occupied regions $B_b$ contain not only regions that are actually occupied, but additionally comprise a safety distance that is to be observed, and can be specified, pre-set, or selectable by the driver.

In order to ascertain the occupied regions, the control unit 30 requires forecast trajectories 22, 24 of the further road users 18, 20. The control unit 30 can determine the trajectories 22, 24 itself, for example based on the surroundings data obtained by the sensors 28, such as the information that an indicator light of a further road user 18, 20 is activated, or based on data exchanged via inter-vehicle communication. Alternatively, the control unit 30 can receive the trajectories 22, 24 directly from the further road users 18, 20 or from the guiding system.

Figure 5:
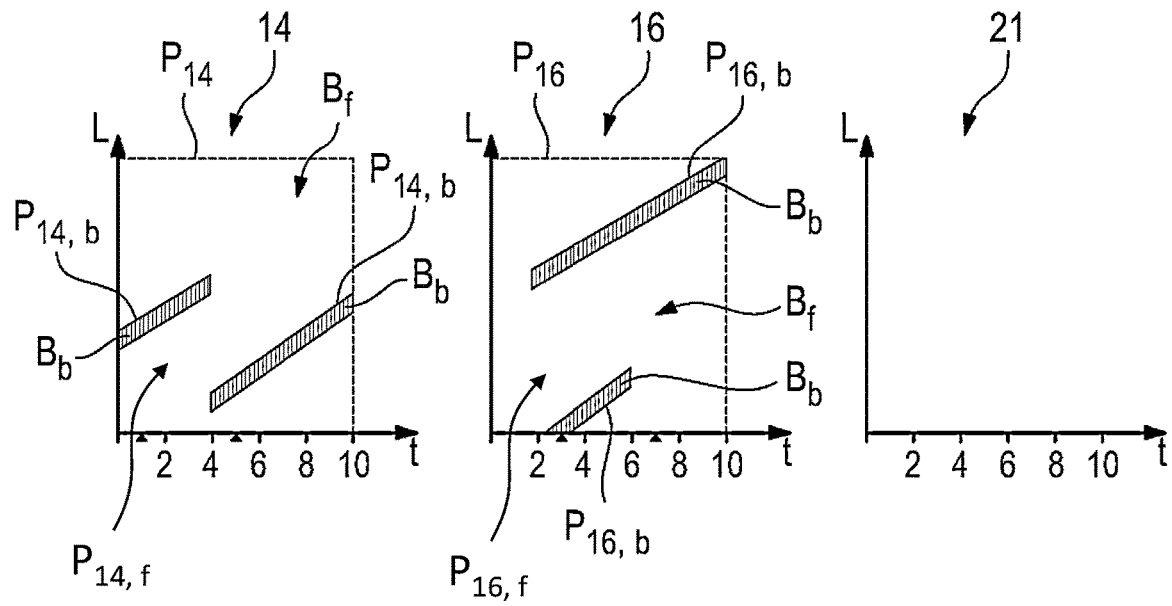

As shown in FIG. 5 by way of the specific example of FIG. 1, the free regions $B_f$ and the occupied regions $B_b$ are initially ascertained in each case for the current driving lane 14 and for the further driving lane 16, specifically in each case in a t-L diagram, with t denoting time.

In this example, the first further road user 18 begins at the time t=1 s to perform a lane change maneuver from the current driving lane 14 to the further driving lane 16, which is complete at time t=5 s. In the diagrams shown in FIG. 5, the first further road user 18 in each case occupies the upper one of the two occupied regions $B_b$. During the lane changing procedure, the first further road user 18 occupies both driving lanes 14, 16, at least for a time.

At time t=3 s, the second further road user 20 begins a lane changing maneuver from the further driving lane 16 to the current driving lane 14, which is complete at time t=7 s. In the diagrams shown in FIG. 5, the second further road user 20 in each case occupies the lower one of the two occupied regions $B_b$.

The slope of the occupied regions $B_b$ here corresponds to the speed of the corresponding further road user 18 or 20. In the example shown in FIGS. 5 to 10, the speed of the further road users 18, 20 is thus constant.

For simplification purposes, the coordinate in the transverse direction N is discretized, that is to say it can only take the three different values that correspond to the current driving lane 14, to the further driving lane 16, or to the lane-changing zone 21. The three diagrams shown in FIG. 5 are thus in each case a t-L diagram for the current driving lane 14, for the further driving lane 16, and for the lane-changing zone 21.

In this case, the hatched sections in the diagrams in each case correspond to the occupied regions $B_b$ of the respective driving lane 14, 16. The non-hatched sections in the diagrams, by contrast, correspond to the free regions $B_f$ of the respective driving lane 14, 16.

To determine the free regions $B_f$, initially a space-time polygon $P_{14}$ or $P_{16}$, corresponding to the entire driving lane 14 and 16, respectively, in front of the motor vehicle 10, in particular to the portion of the driving lanes 14, 16 that lies within range of the sensors 28, is determined for each driving lane 14, 16. In FIG. 5, the polygons $P_{14}$ and $P_{16}$ are the squares indicated by the dashed lines.

Furthermore, space-time polygons $P_{14,b}$ and $P_{16,b}$, which enclose the occupied regions $B_b$ of the respective driving lane 14, 16, are ascertained for the two driving lanes 14, 16 in each case.

The free regions $B_f$ in the current driving lane 14, or more specifically a polygon $P_{14,f}$ that corresponds to the free regions $B_f$, is then ascertained by polygon clipping in that the polygons $P_{14,b}$ are removed from the polygon $P_{14}$. In other words, this is the operation $$P_{14,f} = P_{14} \backslash P_{14,b}.$$

Analogously, the free regions $B_f$ in the further driving lane 16 are ascertained by polygon clipping in that the polygons $P_{16,b}$ are removed from the polygon $P_{16}$. In other words, the operation $P_{16,f} = P_{16} \setminus P_{16,b}$ is performed.

Figure 6:
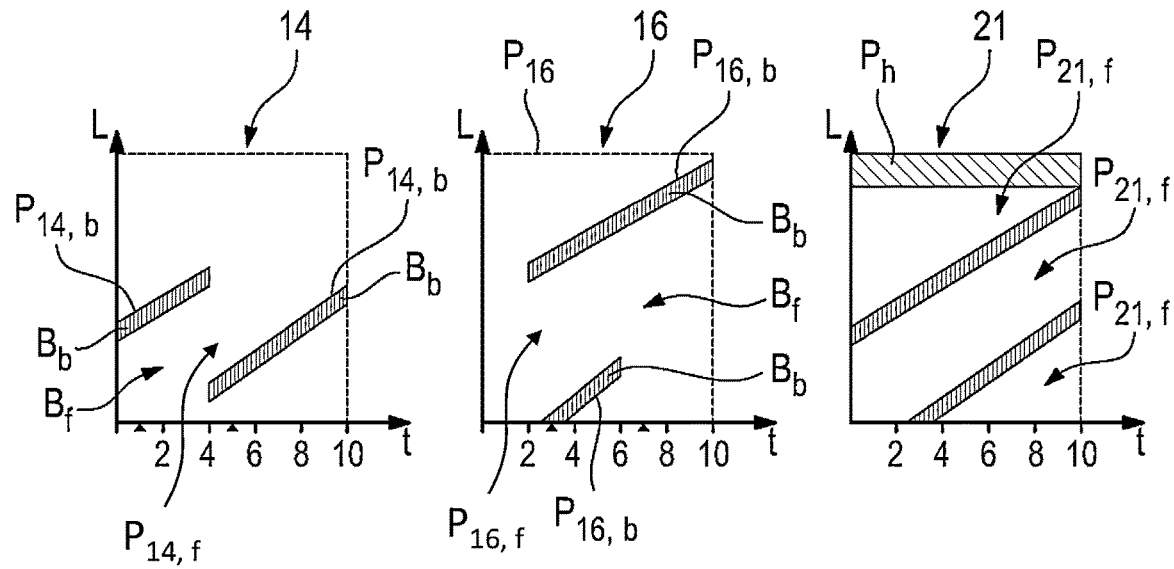

Next, as is illustrated in FIG. 6, the free partial regions of the lane-changing zone 21 are determined (step S3). The lane-changing zone 21 is here free precisely when both the current driving lane 14 and the further driving lane 16 are free and when the lane-changing zone 21 is not impassable for any other reasons, for example due to obstacles or because overtaking is prohibited.

Therefore, the free partial regions of the lane-changing zone 21, or more specifically a polygon $P_{21,f}$, which corresponds to the free partial regions of the lane-changing zone 21, are ascertained as the intersection of the two polygons $P_{14,f}$ and $P_{16,f}$. If the lane-changing zone 21 is impassable due to an obstacle or for other reasons, a corresponding space-time polygon $P_h$, which encloses the impassable partial region of the lane-changing zone 21, is ascertained and removed from the abovementioned intersection.

In other words, the free partial regions $P_{21,f}$ of the lane-changing zone 21 are thus obtained by the operation $$P_{21,f} = (P_{14,f} \cap P_{16,f}) \setminus P_h.$$

Figure 7:
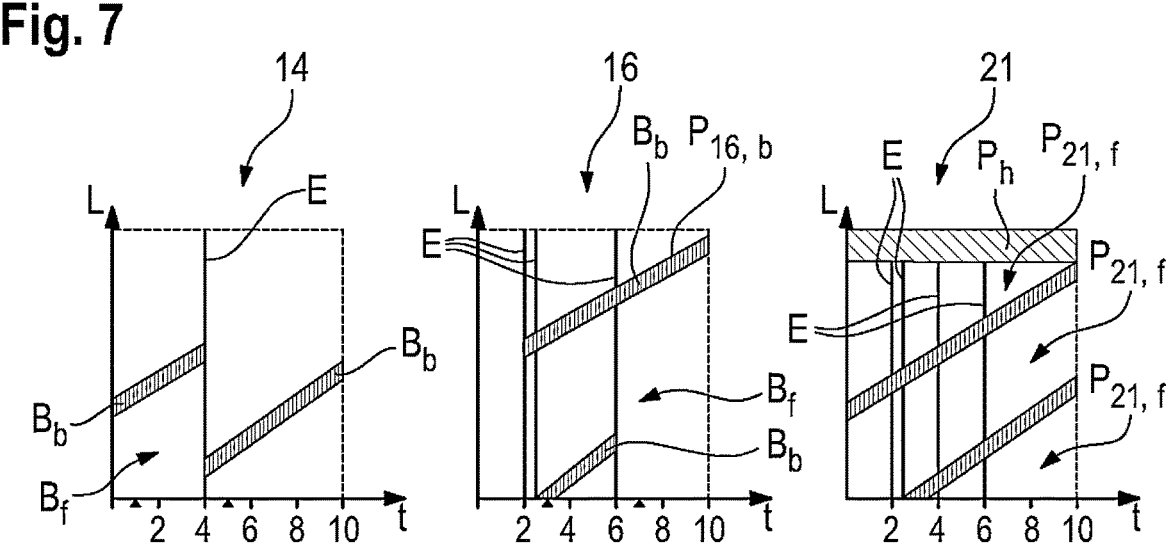

The diagrams for the current driving lane 14 and for the further driving lane 16 are now divided in each case into time strips (step S4), wherein a new time strip begins with each event. In FIG. 7, the different time strips are separated from one another by vertical separating lines E, which are each inserted into the diagram at an event. An event is here and below understood to mean any type of change in the occupation status of the respective driving lane 14, 16.

In other words, if an occupation of an arbitrary partial region of the current driving lane 14 or of the further driving lane 16 begins or ends at a specific time, a new time strip begins at this time in the diagram for the current driving lane 14 or for the further driving lane 16.

The separating lines E between the individual time strips in the diagrams for both driving lanes 14, 16 are additionally transferred to the diagram for the lane-changing zone 21.

Figure 9:
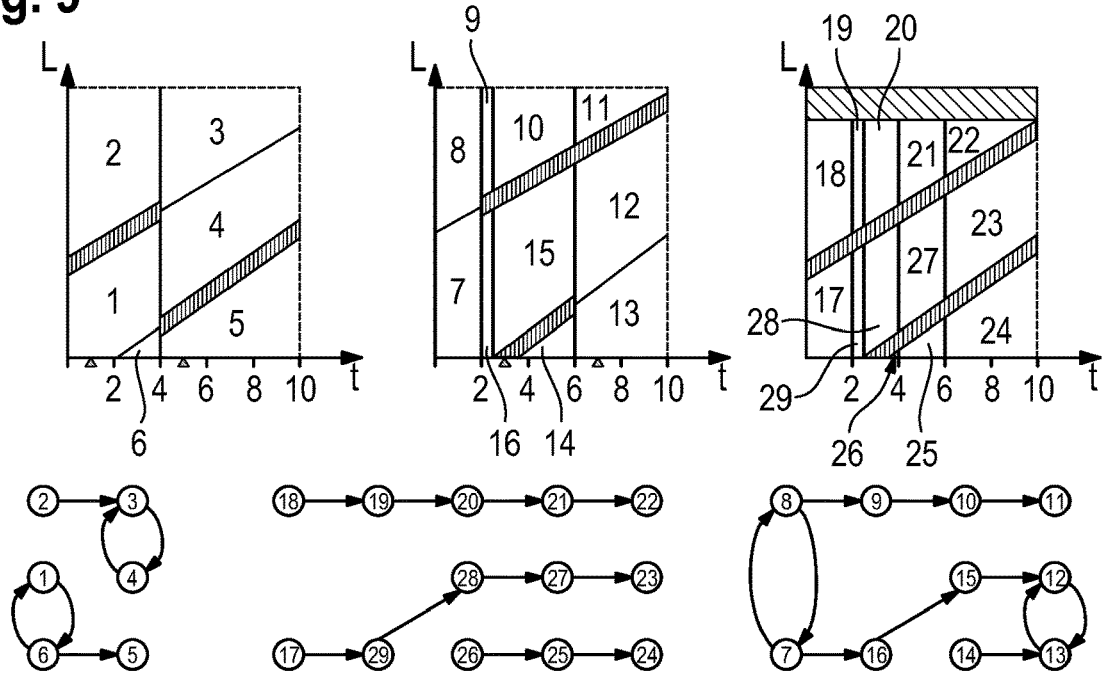
Figure 10:
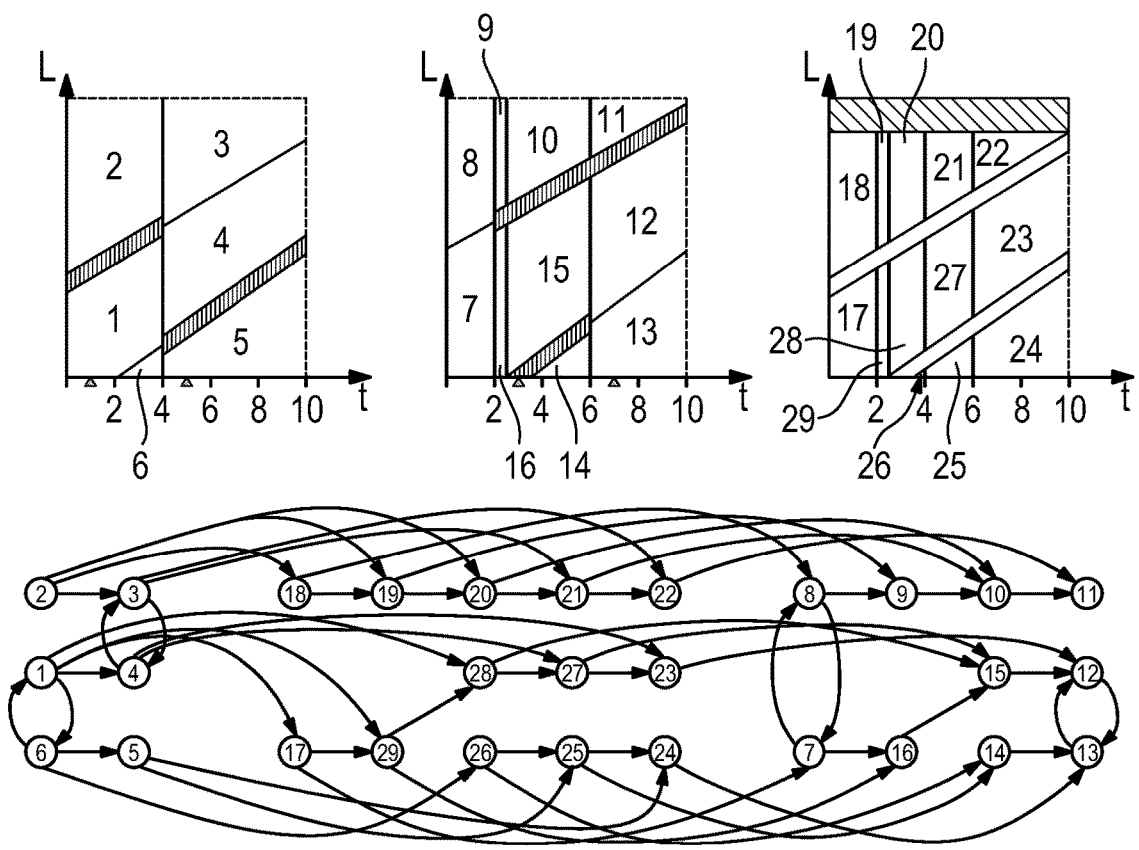

In order to achieve a consistent division of the diagrams between the three diagrams for the current driving lane 14, for the further driving lane 16, and for the lane-changing zone 21, oblique separating lines T, representing in each case an extension of one of the occupied regions $B_b$, are inserted into the diagrams for the current driving lane 14 and the further driving lane 16. These additional oblique separating lines T are shown in FIGS. 8 to 10.

The vertical separating lines E, the oblique separating lines T, and the occupied regions $B_b$ divide each of the three diagrams into a plurality of partial regions $T_i$, wherein i is a natural number greater than zero, which can take values from 1 up to a total number of partial regions $T_i$.

Figure 8:
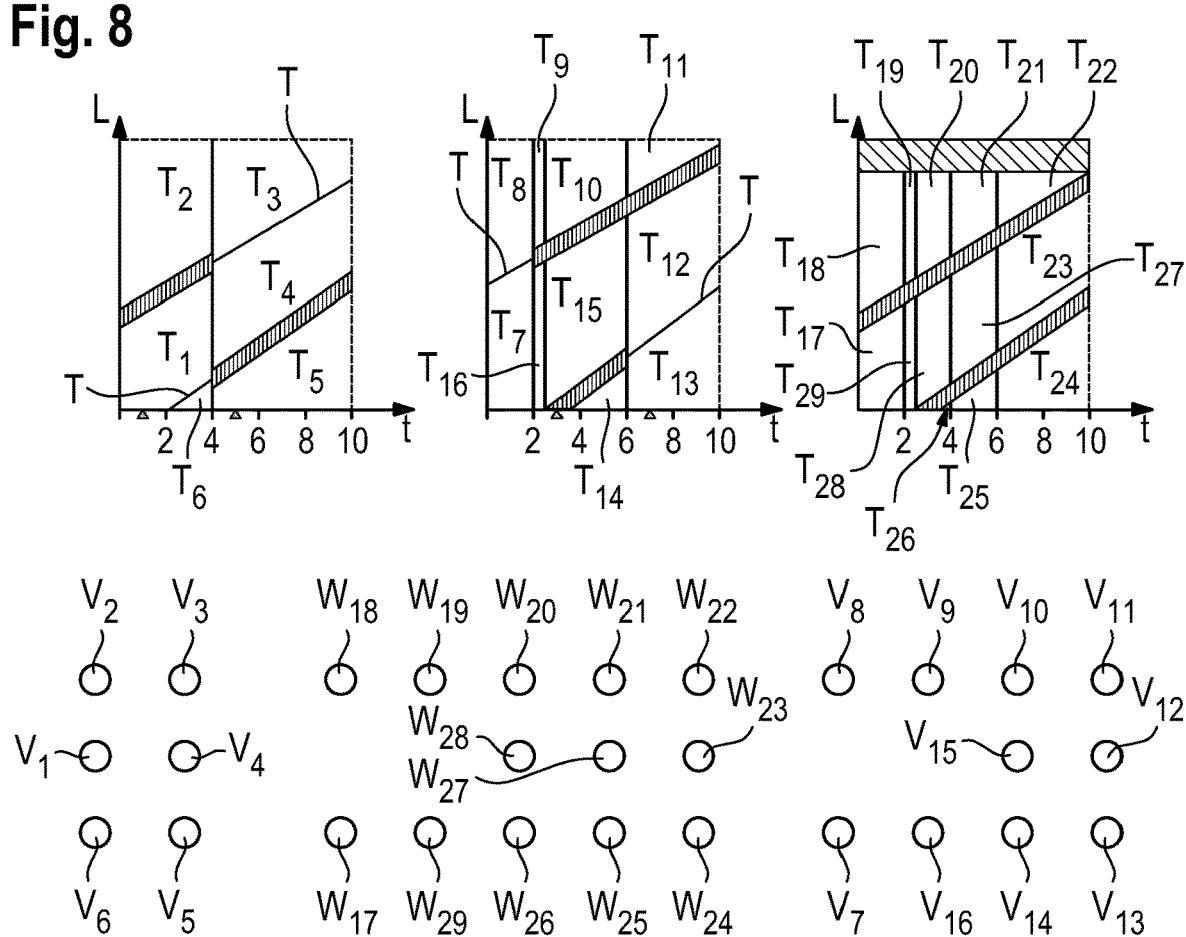

Next, as shown in FIG. 8, each of the partial regions $T_i$ of the diagrams for the current driving lane 14 and for the further driving lane 16 is assigned in each case a lane vertex $V_i$, while each partial region $T_i$ of the diagram for the lane-changing zone 21 is assigned in each case a changing zone vertex $W_i$ (step S5). Once again, i is a natural number greater than zero, which can take values from 1 up to a total number of partial regions $T_i$.

In FIG. 8, the lane vertices $V_i$ and the changing zone vertices $W_i$ are in each case arranged by time in the diagram, i.e. those vertices that correspond to partial regions $T_i$ with smaller times are located further to the left than those vertices that are assigned to partial regions $T_i$ having greater times.

Next, the lane vertices $V_i$ of the current driving lane 14 are connected in pairs by edges (step S6), more specifically by directional edges, if a driving maneuver of the motor vehicle 10 between the partial regions $T_i$, to which the lane vertices $V_i$ are assigned, is possible.

A driving maneuver is then defined as "possible" precisely when the two partial regions $T_i$ immediately join one another, that is to say are not separated by an occupied region $B_b$. In addition, a driving maneuver is of course only ever possible in the positive time direction.

The same procedure is repeated for the lane vertices $V_i$ of the further driving lane 16 and for the changing zone vertices $W_i$ of the lane-changing zone 21.

It should be noted that in FIGS. 9 and 10, the letters "T," "V," and "W" are omitted for clarity reasons. Instead, the partial regions and the vertices have been simply provided with the corresponding number. That is to say, in FIGS. 9 and 10, numbers are not reference signs but represent the index of the corresponding partial region or of the corresponding vertex.

The result of step S6 is shown in FIG. 9. The graph obtained in step S6 already contains all possible driving maneuvers for the motor vehicle 10 within the two driving lanes 14, 16 and within the lane-changing zone 21.

Next, those lane vertices $V_i$ of the current driving lane 14 are connected to those changing zone vertices $W_i$ by directional edges whose assigned partial regions $T_i$ of the current driving lane 14 and of the lane-changing zone 21 overlap one another (step S7). In other words, those lane vertices $V_i$ are connected to those changing zone vertices $W_i$ whose assigned partial regions $T_i$ have an intersection that is not empty if the two diagrams for the current driving lane 14 and for the lane-changing zone 21 are laid one on top of the other.

In addition, those changing zone vertices $W_i$ are connected to those lane vertices $V_i$ of the further driving lane 16 by directional edges whose assigned partial regions $T_i$ of the lane-changing zone 21 and of the further driving lane 16 overlap one another. In other words, those lane vertices $V_i$ are connected to those changing zone vertices $W_i$ whose assigned partial regions $T_i$ have an intersection that is not empty when the two diagrams for the further driving lane 16 and for the lane-changing zone 21 are laid one on top of the other.

In other words, the individual partial regions $T_i$ of the free regions $B_f$ are divided in step S7 into changing regions, in which a driving lane change between the two driving lanes 14, 16 is possible, and into lane-keeping regions, in which a driving lane change between the two driving lanes 14, 16 is not possible.

The result of step S7 is shown in FIG. 10. The graph obtained in step S7 contains all possible driving maneuvers for the motor vehicle 10 that include a change from the current driving lane 14 into the further driving lane 16. Each of the possible driving maneuvers here corresponds to an uninterrupted train of edges in the graph shown in FIG. 10.

The different possible driving maneuvers thus ascertained are then processed further by a further module of the control unit 30 or by a further module of the computer program.

The further module selects, from the different possible driving maneuvers, at least one driving maneuver that can be performed (step S8).

For this purpose, the further module ascertains whether the motor vehicle 10 can actually reach the individual spatio-temporal partial regions $T_i$, wherein a current speed of the motor vehicle 10, a maximum deceleration of the motor vehicle 10, a maximum acceleration of the motor vehicle 10, and/or any speed limit that may be applicable to the road 12 are taken into consideration. Partial regions $T_i$ that cannot be reached are removed by the further module and no longer taken into account subsequently.

Next, the further module computes a trajectory for the motor vehicle 10 that corresponds to the at least one driving maneuver (step S9). If a plurality of driving maneuvers are still available for selection, a corresponding trajectory for each of these driving maneuvers is ascertained.

In order to determine the trajectory that should ultimately be used by the control unit 30 for controlling the motor vehicle 10, various filters and/or conditions can also be applied to the trajectories or, respectively, required of the trajectories.

For example, the trajectory that is to be taken must be collision-free and should possibly not require any longitudinal and/or transverse accelerations of the motor vehicle 10 that are greater than a predefined limit acceleration.

Finally, one of the possible trajectories is selected and the motor vehicle 10 is controlled by the control unit 30 in an at least partially automated manner, in particular in a fully automated manner, according to the selected driving maneuver (step S10).

Alternatively or additionally, information relating to the driving maneuver can be displayed for a driver of the motor vehicle 10 based on the selected driving maneuver. In particular, a plurality of possible driving maneuvers are selected, and the driver can decide which of the possible driving maneuvers should be performed.

The invention claimed is:

1. A method of controlling a motor vehicle driving on a road in a current driving lane, wherein the road has at least one further driving lane adjacent to the current driving lane of the motor vehicle, the method comprising:
determining free regions and/or occupied regions, which are occupied by other road users, in two driving lanes including at least in the current driving lane of the motor vehicle and in the at least one further driving lane, wherein the free regions and the occupied regions are spatio-temporal regions, and wherein forecast trajectories of the other road users are taken into account in the determining of the free regions and/or the occupied regions;
determining changing regions, in which a driving lane change between the two driving lanes is possible, and/or lane-keeping regions, in which a driving lane change between the two driving lanes is not possible, based on the determined free regions and/or occupied regions, wherein the changing regions and the lane-keeping regions are each a spatio-temporal partial region of the free regions;
determining possible driving maneuvers of the motor vehicle at least between changing regions and/or lane-keeping regions that adjoin one another in pairs; and
controlling the motor vehicle to perform one of a driving lane change maneuver or a lane-keeping maneuver, from among the possible driving maneuvers, based at least on the determined changing regions and/or lane-keeping regions.

2. The method as claimed in claim 1, wherein the changing regions are those partial regions of the free regions of the current driving lane and of the at least one further driving lane in which both the current driving lane and the at least one further driving lane are free from other road users.

3. The method as claimed in claim 2, wherein the lane-keeping regions are those partial regions of the free regions of the current driving lane and of the at least one further driving lane in which the respectively other one of the driving lanes is occupied and/or a driving lane change is otherwise not possible.

4. The method as claimed in claim 1, wherein, in determining the changing regions, a determination is made as to whether a lane-changing zone located spatially between the current driving lane and the at least one further driving lane is free, is occupied by other road users, or is otherwise impassable.

5. A method of controlling a motor vehicle driving on a road in a current driving lane, wherein the road has at least one further driving lane adjacent to the current driving lane of the motor vehicle, the method comprising:
determining free regions and/or occupied regions, which are occupied by other road users, in two driving lanes including at least in the current driving lane of the motor vehicle and in the at least one further driving lane, wherein the free regions and the occupied regions are spatio-temporal regions, wherein at least one space-time polygon corresponding to the current driving lane, at least one space-time polygon corresponding to the at least one further driving lane, and at least one space-time polygon corresponding to the occupied regions is determined, and wherein space-time polygons corresponding to the free regions of the two driving lanes are determined from the determined space-time polygons using polygon clipping to remove those polygons that correspond to the occupied regions from the polygons that correspond to one of the two driving lanes;
determining changing regions, in which a driving lane change between the two driving lanes is possible, and/or lane-keeping regions, in which a driving lane change between the two driving lanes is not possible, based on the determined free regions and/or occupied regions, wherein the changing regions and the lane-keeping regions are each a spatio-temporal partial region of the free regions;
determining possible driving maneuvers of the motor vehicle at least between changing regions and/or lane-keeping regions that adjoin one another in pairs; and
controlling the motor vehicle to perform one of a driving lane change maneuver or a lane-keeping maneuver, from among the possible driving maneuvers, based at least on the determined changing regions and/or lane-keeping regions.

6. The method as claimed in claim 5, wherein an intersection of two polygons that correspond to the free regions in the two driving lanes is formed in order to determine the changing regions and lane-keeping regions, and/or to determine whether a lane-changing zone is free.

7. The method as claimed in claim 1, wherein at least the current driving lane and/or the at least one further driving lane is/are transformed to a Frenet-Serret coordinate system.

8. The method as claimed in claim 1, wherein one lane vertex is assigned to the changing regions and/or the lane-keeping regions of the two driving lanes, wherein the lane vertices are connected in pairs by edges if a driving maneuver of the motor vehicle between the corresponding changing regions and/or the lane-keeping regions is possible, and wherein the lane vertices are arranged by time.

9. The method as claimed in claim 3, wherein a lane-changing zone is assigned at least one changing zone vertex, in particular wherein the lane-changing zone is divided into a plurality of time strips that are each assigned at least one changing zone vertex, wherein the at least one changing zone vertex is connected to lane vertices assigned to the changing regions and/or the lane-keeping regions of the two driving lanes in pairs by edges if a driving maneuver of the motor vehicle between a corresponding partial region of the lane-changing zone and the corresponding changing region or lane-keeping region is possible.

10. The method as claimed in claim 1, wherein a plurality of differing driving maneuvers for the motor vehicle are determined.

11. The method as claimed in claim 1, wherein it is determined whether the motor vehicle can reach a respective spatio-temporal region based on one or more of a current speed of the motor vehicle, a maximum deceleration of the motor vehicle, a maximum acceleration of the motor vehicle, and/or a speed limitation.

12. The method as claimed in claim 1, wherein trajectories of the motor vehicle that correspond to the possible driving maneuvers are determined.

13. The method as claimed in claim 1, wherein at least one sensor captures the current driving lane and/or the at least one further driving lane in order to determine the free regions, occupied regions, and/or impassability.

14. A motor vehicle control system that controls a motor vehicle driving on a road in a current driving lane, wherein the road has at least one further driving lane adjacent to the current driving lane of the motor vehicle, the system comprising:
one or more memories that store a program; and
one or more controllers, communicatively connected to the one or more memories, that execute the stored program to:
determine free regions and/or occupied regions, which are occupied by other road users, at least in the current driving lane of the motor vehicle and in the at least one further driving lane, wherein the free regions and the occupied regions are spatio-temporal regions, and wherein forecast trajectories of the other road users are taken into account in the determining of the free regions and/or the occupied regions;
determine changing regions, in which a driving lane change between the two driving lanes is possible, and/or lane-keeping regions, in which a driving lane change between the two driving lanes is not possible, based on the determined free regions and/or occupied regions, wherein the changing regions and the lane-keeping regions are each a spatio-temporal partial region of the free regions;
determine possible driving maneuvers of the motor vehicle at least between changing regions and/or lane-keeping regions that adjoin one another in pairs; and
control the motor vehicle to perform one of a driving lane change maneuver or a lane-keeping maneuver, from among the possible driving maneuvers, based at least on the determined changing regions and/or lane-keeping regions.

15. The method as claimed in claim 1, wherein at least one space-time polygon corresponding to the current driving lane, at least one space-time polygon corresponding to the at least one further driving lane, and at least one space-time polygon corresponding to the occupied regions is determined, and wherein space-time polygons corresponding to the free regions of the two driving lanes are determined from the determined space-time polygons using polygon clipping to remove those polygons that correspond to the occupied regions from the polygons that correspond to one of the two driving lanes.

16. The method as claimed in claim 5, wherein at least the current driving lane and/or the at least one further driving lane is/are transformed to a Frenet-Serret coordinate system.

17. The method as claimed in claim 5, wherein one lane vertex is assigned to the changing regions and/or the lane-keeping regions of the two driving lanes, wherein the lane vertices are connected in pairs by edges if a driving maneuver of the motor vehicle between the corresponding changing regions and/or the lane-keeping regions is possible, and wherein the lane vertices are arranged by time.

18. The system as claimed in claim 14, wherein at least one space-time polygon corresponding to the current driving lane, at least one space-time polygon corresponding to the at least one further driving lane, and at least one space-time polygon corresponding to the occupied regions is determined, and wherein space-time polygons corresponding to the free regions of the two driving lanes are determined from the determined space-time polygons using polygon clipping to remove those polygons that correspond to the occupied regions from the polygons that correspond to one of the two driving lanes.

19. The system as claimed in claim 14, wherein at least the current driving lane and/or the at least one further driving lane is/are transformed to a Frenet-Serret coordinate system.

20. The system as claimed in claim 14, wherein one lane vertex is assigned to the changing regions and/or the lane-keeping regions of the two driving lanes, wherein the lane vertices are connected in pairs by edges if a driving maneuver of the motor vehicle between the corresponding changing regions and/or the lane-keeping regions is possible, and wherein the lane vertices are arranged by time.

* * * * *